United States Patent
Olejarski

(10) Patent No.: US 10,458,854 B2
(45) Date of Patent: Oct. 29, 2019

(54) DISC CAVITY THERMOCOUPLE

(71) Applicant: Siemens Energy, Inc., Orlando, FL (US)

(72) Inventor: Michael J. Olejarski, Merritt Island, FL (US)

(73) Assignee: Siemens Energy, Inc., Orlando, FL (US)

( * ) Notice: Subject to any disclaimer, the term of this patent is extended or adjusted under 35 U.S.C. 154(b) by 487 days.

(21) Appl. No.: 14/800,741

(22) Filed: Jul. 16, 2015

(65) Prior Publication Data

US 2017/0016774 A1 Jan. 19, 2017

(51) Int. Cl.
*G01K 7/00* (2006.01)
*G01K 1/08* (2006.01)
*G01K 13/02* (2006.01)
*G01K 7/02* (2006.01)

(52) U.S. Cl.
CPC .............. *G01K 1/08* (2013.01); *G01K 7/02* (2013.01); *G01K 13/02* (2013.01); *G01K 2013/024* (2013.01)

(58) Field of Classification Search
None
See application file for complete search history.

(56) References Cited

U.S. PATENT DOCUMENTS

| | | | | | |
|---|---|---|---|---|---|
| 2,660,061 | A | * | 11/1953 | Lewis | G01K 7/04 136/234 |
| 3,012,306 | A | * | 12/1961 | Tiadell | D07B 9/00 136/230 |
| 3,284,247 | A | * | 11/1966 | McCall | G01K 7/04 136/233 |
| 3,811,958 | A | * | 5/1974 | Maurer | H01L 35/32 136/230 |
| 4,767,468 | A | * | 8/1988 | Finney | G01K 1/143 136/229 |
| 4,779,496 | A | * | 10/1988 | Evans | B23D 21/14 30/103 |
| 5,425,353 | A | * | 6/1995 | Herbert | F24C 3/067 126/39 G |
| 5,999,081 | A | * | 12/1999 | Hannigan | G01K 1/10 338/229 |
| 2001/0051095 | A1 | * | 12/2001 | Schotsch | F01D 9/02 415/118 |
| 2004/0114665 | A1 | * | 6/2004 | Park | G01K 1/026 374/179 |
| 2007/0063712 | A1 | * | 3/2007 | Crum | G01B 7/14 324/654 |

OTHER PUBLICATIONS

English translation of JP2006-078305.*

* cited by examiner

*Primary Examiner* — Lisa M Caputo
*Assistant Examiner* — Nasir U. Ahmed

(57) ABSTRACT

A thermocouple and a method for making the thermocouple. The thermocouple includes a thermocouple element shaft and at least one sleeve coupled to the thermocouple element shaft in at least one location of the thermocouple element shaft that is expected to experience wear.

20 Claims, 3 Drawing Sheets

DISC CAVITY THERMOCOUPLE

BACKGROUND OF THE INVENTION

Field of the Invention

This invention relates generally to a thermocouple and, more particularly, to a disc cavity thermocouple for a gas turbine engine that includes one or more outer sleeves along a thermocouple element shaft, where the one or more outer sleeves are wider than the thermocouple element shaft and are located at expected wear locations of the thermocouple.

Discussion of the Related Art

The world's energy needs continue to rise which provides a demand for reliable, affordable, efficient and environmentally-compatible power generation. A gas turbine engine is one known machine that provides efficient power, and often has application for an electric generator in a power plant, or engines in an aircraft or a ship. A typical gas turbine engine includes a compressor section, a combustion section and a turbine section. The compressor section provides a compressed air flow to the combustion section where the air is mixed with a fuel, such as natural gas, and ignited to create a hot working gas. The working gas expands through the turbine section and is directed across rows of blades therein by associated vanes. As the working gas passes through the turbine section, it causes the blades to rotate, which in turn causes a shaft to rotate, thereby providing mechanical work.

The temperature of the working gas is tightly controlled so that it does not exceed some predetermined temperature for a particular turbine engine design because too high of a temperature can damage various parts and components in the turbine section of the engine. However, it is desirable to allow the temperature of the working gas to be as high as possible because the higher the temperature of the working gas, the faster the flow of the gas, which results in a more efficient operation of the engine.

In certain gas turbine engine designs, a portion of the compressed air flow is also used to provide cooling for certain components in the turbine section, typically the vanes, blades and ring segments. The more cooling and/or the more efficient cooling that can be provided to these components allows the components to be maintained at a lower temperature, and thus the higher the temperature of the working gas can be. For example, by reducing the temperature of the compressed gas, less compressed gas is required to maintain the part at the desired temperature, resulting in a higher working gas temperature and a greater power and efficiency from the engine. Further, by using less cooling air at one location in the turbine section, more cooling air can be used at another location in the turbine section. In one known turbine engine design, 80% of the compressed air flow is mixed with the fuel to provide the working gas and 20% of the compressed air flow is used to cool the turbine section parts. If less of that cooling air is used at one particular location as a result of the cooling air being lower in temperature, then more cooling air can be used at other areas in the turbine section for increased cooling.

Two disc cavity thermocouples are commonly provided in rows 2, 3 and 4 of the blades in a gas turbine engine, and are used to measure temperature and control cooling for the row that the thermocouples are in. The thermocouple is installed by feeding the thermocouple down guide tubes approximately 5-6 feet in a manner known to those skilled in the art. When one thermocouple in a row fails, the turbine engine can still run using the other thermocouple that is in the same row. If both thermocouples in a particular row fail, the turbine engine loses the capability to control cooling for that row and also loses visibility to the disc cavity temperatures, thereby putting the rotor at risk for damage and/or failure.

SUMMARY OF THE INVENTION

This disclosure describes a thermocouple for a gas turbine engine and a method for making the thermocouple. Thermocouple includes a thermocouple element shaft and at least one sleeve coupled to the thermocouple element shaft in at least one location of the thermocouple element shaft that is expected to experience wear.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a thermocouple is merely exemplary in nature, and is in no way intended to limit the invention or its applications or uses. For example, the thermocouple configurations described herein are described as being used in connection with a gas turbine engine, however, the thermocouple configurations may be used in any instance where a preload on a thermocouple is required.

Reference throughout the specification using phrases such as "various embodiments," "some embodiments," "one embodiment," "some example embodiments," "one example embodiment," "an embodiment" or similar language means that a particular feature, structure or characteristic described in connection with any embodiment is included in at least one embodiment, meaning that the phrases set forth above, or similar language, as used throughout the specification, are not necessarily referring to the same embodiment. Particular features, structures or characteristics described in the specification may be combined in any suitable manner in one or more embodiments, thus, any failure to specifically describe a combination or sub-combination of particular features should not be understood as an indication that combinations or sub-combinations of features is/are not possible.

Figure 1:
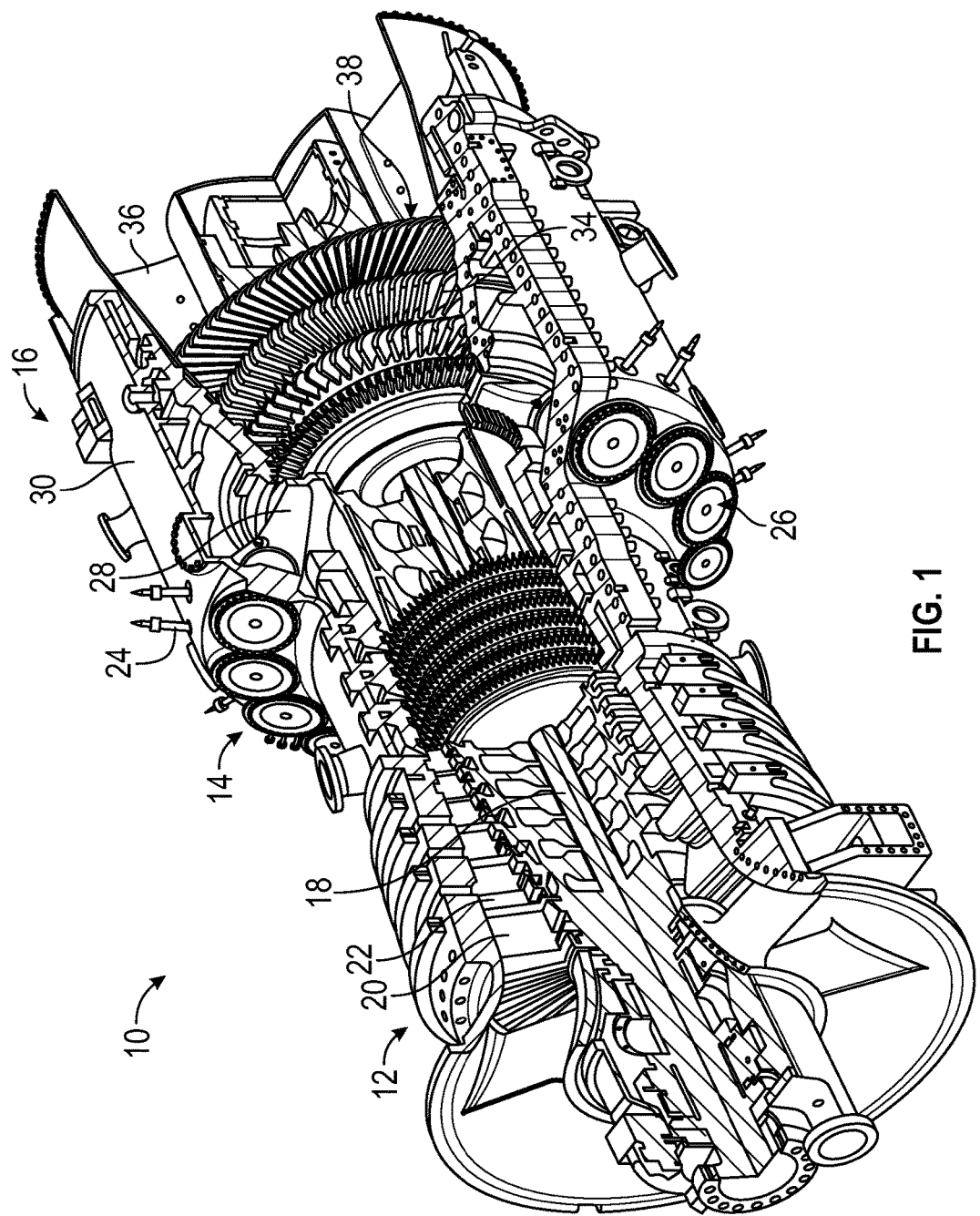
FIG. 1 is a cut-away, isometric view of a gas turbine engine.

FIG. 1 is a cut-away, isometric view of a gas turbine engine 10 including a compressor section 12, a combustion section 14 and a turbine section 16 all enclosed within an outer housing 30, where operation of the engine 10 causes a central shaft or rotor 18 to rotate, thus creating mechanical work. The engine 10 is illustrated and described by way of a non-limiting example to give context to the invention discussed below. Those skilled in the art will appreciate that other gas turbine engine designs will also benefit from the invention. Rotation of the rotor 18 draws air into the compressor section 12 where it is directed by vanes 22 and compressed by rotating blades 20 to be delivered to the combustion section 14 where the compressed air is mixed with a fuel, such as natural gas, and where the fuel/air mixture is ignited to create a hot working gas. More specifically, the combustion section 14 includes a number of circumferentially disposed combustors 26 each receiving the fuel that is injected into the combustor 26 by an injector (not shown) and mixed with the compressed air to be ignited by an igniter 24 to create the working gas, which is directed by a transition 28 into the turbine section 16. The working gas is directed by circumferentially disposed stationary vanes (not shown) in the turbine section 16 to flow across circumferentially disposed rotatable turbine blades 34, which causes the turbine blades 34 to rotate, thus rotating the rotor 18. Once the working gas passes through the turbine section 16 it is output from the engine 10 as an exhaust gas through an output nozzle or exhaust gas diffuser 36.

Each group of the circumferentially disposed stationary vanes defines a row of the vanes and each group of the circumferentially disposed blades 34 defines a row 38 of the blades 34. In this non-limiting embodiment, the turbine section 16 includes four rows 38 of the rotating blades 34 and four rows of the stationary vanes in an alternating sequence. In other gas turbine engine designs, the turbine section 16 may include more or less rows of the turbine blades 34. It is noted that the most forward row of the turbine blades 34, referred to as the row 1 blades, and the vanes, referred to as the row 1 vanes, receive the highest temperature of the working gas, where the temperature of the working gas decreases as it flows through the turbine section 16.

Figure 2:
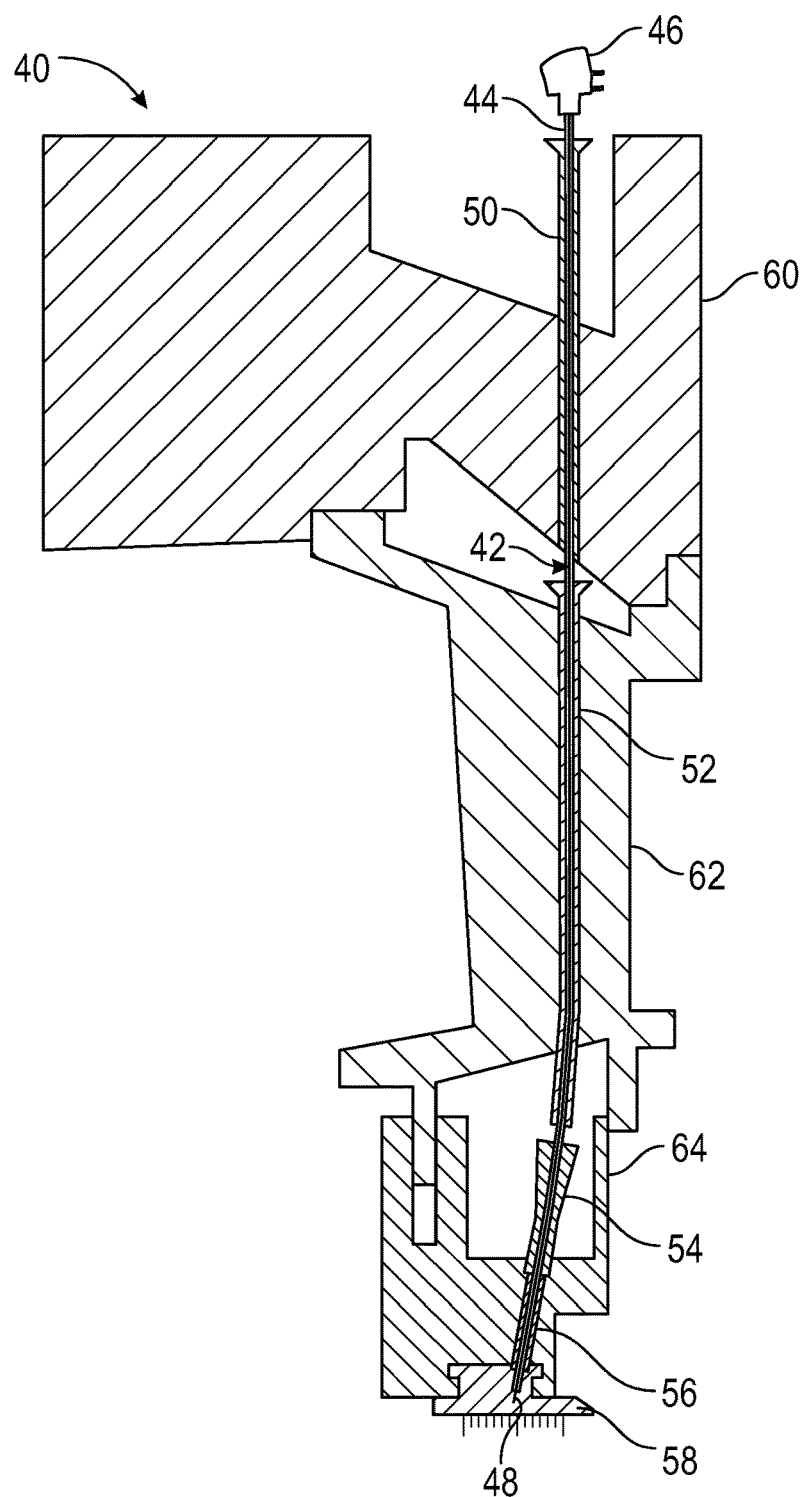
FIG. 2 is a cut-away, side view of a thermocouple inserted in a gas turbine engine using guide tubes.

FIG. 2 is a is a cut-away, side view of a section 40 of a gas turbine engine, such as, for example, the gas turbine engine 10, that includes a thermocouple 42 inserted into the turbine section 16 of the engine 10 using guide tubes in a manner that is known to those skilled in the art. The configuration of the thermocouple 42 in the gas turbine engine 10 described herein is known as a disc cavity thermocouple. Typically, there are two thermocouples 42 in each of row 2, row 3 and row 4 of the turbine blades 34. The thermocouple 42 includes a flexible thermocouple element shaft 44 having a thermocouple sensor 48 at a tip of the shaft 44, where the sensor 48 is positioned to monitor the temperature of the working gas flowing in the turbine section 16 of the engine 10. An electrical connector 46 is provided at an end of the shaft 42 opposite to the sensor 44 to provide an electrical connection to the sensor 48 through the shaft 44.

The thermocouple element shaft 44 passes through a first guide tube 50 that extends from a blade ring entry region through a blade ring region 60 of, for example, the row 38 of the blades 34. The thermocouple shaft element 44 also passes through a second guide tube 52 that extends through a blade ring to vane region 62, a third guide tube 54 that extends through a vane region into to interstage seal housing region 64, and a fourth guide tube 56 that extends through the interstage seal housing region 64 and into a seal segment 58 where temperature readings of the cooling air are measured by the thermocouple 42. The guide tubes 50, 52, 54 and 56 may or may not overlap one another, as is known to those skilled in the art. The number of guide tubes shown in FIG. 2 is merely exemplary, as the number and location of the guide tubes may vary for a variety of reasons, such as the design of the engine 10.

It is known that the thermocouple 42 has a tendency to fail, as set forth above. The cause of thermocouple failure was originally thought to be misalignment between one or more of the guide tubes 50, 52, 54 and 56 and the thermocouple element shaft 44, causing the thermocouple element shaft 44 that is within the guide tubes 50, 52, 54 and 56 to ride on one side of the guide tubes 50, 52, 54 and 56, thereby causing the thermocouple element shaft 44 to wear. In an attempt to eliminate this misalignment potential, blade ring assembly processes were improved and hardware was changed to improve the alignment. However, these efforts failed to improve the situation, and failure of the thermocouple 42 continued to occur.

The cause of failure of the thermocouple 42 has been determined to be the amount of preload applied to the thermocouple 42. Too much preload causes a buckling effect that forces the thermocouple element shaft 44 to one side or the other, causing the thermocouple element shaft 44 to wear and eventually fail. However, a preload is required to keep the thermocouple 42 seated throughout thermal cycles of the gas turbine engine 10. If not enough preload is applied to the thermocouple 42, the thermocouple 42 becomes "unseated", causing the temperature measurement to be inaccurate. Since preloading the thermocouple 42 is required, additional features must be added to the thermocouple 42 to protect the thermocouple element shaft 44 from premature wear.

Figure 3:
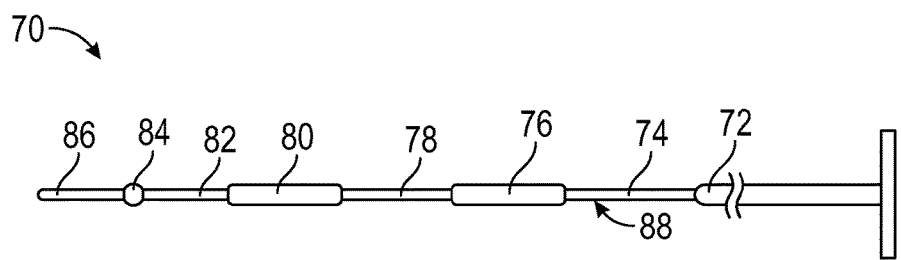
FIG. 3 is an illustration of an embodiment of a thermocouple according to the invention.

FIG. 3 is an illustration of a thermocouple 70 according to an embodiment of the invention that can replace the thermocouple 42. Because most of the wear and failures of the thermocouple 42 occurs on portions of the thermocouple element shaft 44 that are not protected by the guide tubes 50, 52, 54 and 56, i.e., occur on portions of the thermocouple element shaft 44 that are between a guide tube and next guide tube, the thermocouple 70 includes a thermocouple element shaft 88 having sleeves 76 and 80 that are located on regions of the thermocouple element shaft 88 that are not protected by guide tubes. The sleeves 76 and 80 may be located along the thermocouple element shaft 88 in any suitable region, as damage may occur in various places due to preload, i.e., damage may occur in areas that are protected by guide tubes. The thermocouple element shaft 88 includes element sections 74, 78, 82 and 86 that are regions of the continuous thermocouple element shaft 88 and that are smaller in diameter than the sleeves 76 and 80. The sleeves 76 and 80 are a sheathing that is made of any material that is suitable for the high temperature environment of the turbine engine 10, such as, by way of example, stainless steel. The sleeves 76 and 80 may be affixed over the thermocouple element shaft 88 to create the element sections 64, 68, 72 and 76 in any suitable manner, such as, by way of example, crimping or welding. An outer sheathing 72 extends from a terminal block to a location where the thermocouple 70 must make a turn or bend, as is known to those skilled in the art.

The size of the sleeves 76 and 80 and the size of the element sections 74, 78, 82 and 86 that are part of the continuous thermocouple shaft 88 are determined by the inner diameter and radius of the guide tubes 50, 52, 54 and 56 that the thermocouple element shaft 88 must pass through while being installed and seated within during the life of the thermocouple 70. In an exemplary embodiment, the element sections 74, 78, 82 and 86 may be approximately 0.125 inches in diameter, and the sleeves 76 and 80 may be approximately 0.25 inches in diameter. However, any suitable diameter may be used for the element sections 74, 78, 82 and 86 and the sleeves 76 and 80. Furthermore, the position and the number of the sleeves 76 and 80 may be determined by the geometry of the guide tubes 50, 52, 54 and 56 and the gas turbine engine 10 being used, as well as by the most likely wear points.

In this embodiment, the sleeve 80 is approximately four inches from an end of the element section 86, and the sleeve 80 is between the element sections 82 and 86. A spherical fitting 84 is affixed to the thermocouple element shaft 88 between the element sections 82 and 86 to act as a mechanical stop for a thermocouple tip in a manner known to those skilled in the art. The sleeve 80 is approximately two inches long. The sleeve 76 is between the element sections 74 and 78. Both the element section 78 and the sleeve 76 are approximately two inches long as shown in the exemplary embodiment of FIG. 3. The thermocouple 70 may be made of any suitable material such as, by way of example, Inconel or stainless steel. The preload applied to the thermocouple 70 is approximately 0.2 inches, however, the preload applied to the thermocouple 70 may vary.

Figure 4:
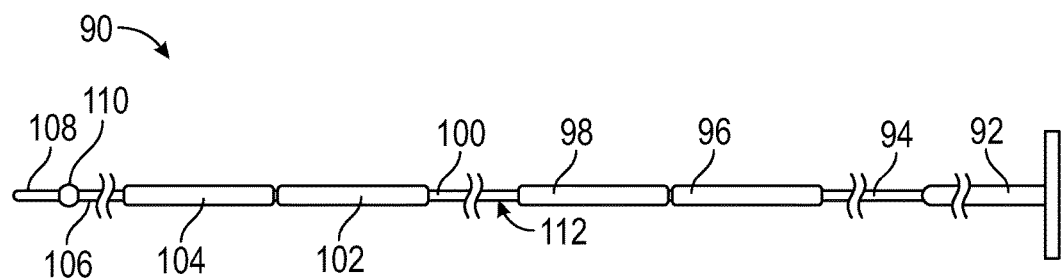
FIG. 4 is an illustration of another embodiment of the thermocouple according to the invention.

FIG. 4 is an illustration of a thermocouple 90 according to another exemplary embodiment of the invention and can be used to replace the thermocouple 42. The thermocouple 90 includes a thermocouple element shaft 112, sleeves 96, 98, 102 and 104, and element sections 94, 100, 106 and 108. As shown in this embodiment, the sleeve 96 is between the sleeve 98 and the element section 94. The sleeve 98 is between the sleeve 96 and the element section 100. The sleeve 102 is between the sleeve 104 and the element section 100, and the sleeve 104 is between the sleeve 102 and the element section 106. Placing the sleeves 96 and 98 adjacent to each other and the sleeves 102 and 104 adjacent to each other provides the advantage of protecting the thermocouple 90 in locations where the thermocouple 90 has to bend and is likely to experience wear without compromising the ability of the thermocouple to bend. The sleeves 96, 98, 102 and 104 may be any suitable length, such as one or two inches. Similarly, the element sections 94, 100, 106 and 108 may be any suitable length. A spherical fitting 110 is affixed to the thermocouple element shaft 112 between the element sections 106 and 108 to act as a mechanical stop for a thermocouple tip in a manner known to those skilled in the art. An outer sheathing 92 extends from a terminal block to a location where the thermocouple 90 must make a turn or bend, as is known to those skilled in the art.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A thermocouple comprising:
a thermocouple element shaft;
at least one guide tube and at least one next guide tube arranged next to the at least one guide tube along the thermocouple element shaft with a region in between, wherein the thermocouple element shaft passes through the one guide tube and the one next guide tube and the region in between that is not protected by the at least one guide tube and the at least one next guide tube; and
at least one sleeve that is affixed to the thermocouple element shaft, said at least one sleeve being wider than the thermocouple element shaft,
wherein said at least one sleeve is located along the region of the thermocouple element shaft between the one guide tube and the one next guide tube that is not protected by the at least one guide tube and the at least one next guide tube.

2. The thermocouple according to claim 1 wherein the at least one sleeve is affixed to the thermocouple element shaft by crimping the at least one sleeve to the thermocouple element shaft.

3. The thermocouple according to claim 1 wherein the at least one sleeve is affixed to the thermocouple element shaft by welding the at least one sleeve to the thermocouple element shaft.

4. The thermocouple according to claim 1 wherein the at least one sleeve is approximately twice as wide in diameter relative to the thermocouple element shaft.

5. The thermocouple according to claim 1 wherein the at least one sleeve includes at least two sleeves that are spaced apart from each other.

6. The thermocouple according to claim 1 wherein the at least one sleeve includes at least two sleeves that are adjacent to one another.

7. The thermocouple according to claim 1 wherein the at least one sleeve is approximately two inches long.

8. The thermocouple according to claim 1 wherein the at least one sleeve is approximately one inch long.

9. A disc cavity thermocouple for measuring temperature in a gas turbine engine, said disc cavity thermocouple comprising:
a thermocouple element shaft;
at least one guide tube and at least one next guide tube arranged next to the at least one guide tube along the thermocouple element shaft with a region in between, wherein the thermocouple element shaft passes through the one guide tube and the one next guide tube and the region in between that is not protected by the at least one guide tube and the at least one next guide tube; and
at least one sleeve that is affixed to the thermocouple element shaft, said at least one sleeve being wider than the thermocouple element shaft,
wherein said at least one sleeve is located along the region of the thermocouple element shaft between the one guide tube and the one next guide tube that is not protected by the at least one guide tube and the at least one next guide tube.

10. The disc cavity thermocouple according to claim 9 wherein the at least one sleeve is affixed to the thermocouple element shaft by crimping the at least one sleeve to the thermocouple element shaft.

11. The disc cavity thermocouple according to claim 9 wherein the at least one sleeve is affixed to the thermocouple element shaft by welding the at least one sleeve to the thermocouple element shaft.

12. The disc cavity thermocouple according to claim 9 wherein the at least one sleeve is approximately twice as wide in diameter relative to the thermocouple element shaft.

13. The disc cavity thermocouple according to claim 9 wherein the at least one sleeve includes at least two sleeves that are spaced apart from each other.

14. The disc cavity thermocouple according to claim 9 wherein the at least one sleeve includes at least two sleeves that are adjacent to each other.

15. The disc cavity thermocouple according to claim 9 wherein the at least one sleeve is approximately two inches long.

16. The disc cavity thermocouple according to claim 9 wherein the at least one sleeve is approximately one inch long.

17. A method for creating a thermocouple, said method comprising:
providing a thermocouple element shaft;

arranging at least one guide tube and at least one next guide tube next to the at least one guide tube along the thermocouple element shaft with a region in between, wherein the thermocouple element shaft passes through the one guide tube and the one next guide tube and the region in between that is not protected by the at least one guide tube and the at least one next guide tube and affixing at least one sleeve to the thermocouple element shaft, said at least one sleeve being wider than the thermocouple element shaft wherein said at least one sleeve is located along the region of the thermocouple element shaft between the one guide tube and the one next guide tube that is not protected by the at least one guide tube and the at least one next guide tube.

18. The method according to claim 17 wherein affixing the at least one sleeve to the thermocouple element shaft includes affixing the at least one sleeve to the element by crimping or welding.

19. The method according to claim 17 wherein the at least one sleeve is approximately twice as wide in diameter relative to the thermocouple element shaft.

20. The method according to claim 17 wherein the at least one sleeve is at least two sleeves that are spaced apart from each other or adjacent to each other.

* * * * *